US004001673B2

United States Statutory Invention Registration [19]

[11] Reg. Number: H1673

Hanson

[45] Published: Aug. 5, 1997

[54] COOLING DEVICE FOR SOLID STATE LASER

[76] Inventor: Frank E. Hanson, 4478 Marseilles St., San Diego, Calif. 92107

[21] Appl. No.: 581,699

[22] Filed: Dec. 29, 1995

[51] Int. Cl.[6] ..... H01S 3/04

[52] U.S. Cl. ..... 372/35; 372/34

[58] Field of Search ..... 372/39, 66, 41, 372/69, 75, 92, 34, 40, 101

[56] References Cited

U.S. PATENT DOCUMENTS

| | | | |
|---|---|---|---|
| 3,493,888 | 2/1970 | Jackson . | |
| 3,569,860 | 3/1971 | Booth . | |
| 3,614,663 | 10/1971 | Palanos . | |
| 3,631,362 | 12/1971 | Almasi . | |
| 3,675,156 | 7/1972 | Danielmeyer . | |
| 3,891,945 | 6/1975 | Schlossberg et al. | 372/66 |
| 4,150,341 | 4/1979 | Ferguson . | |
| 4,163,200 | 7/1979 | DeMaggio | 372/101 |
| 4,176,326 | 11/1979 | Wittig et al. . | |
| 4,233,567 | 11/1980 | Chernoch . | |
| 4,507,787 | 3/1985 | Daly et al. | 372/66 |
| 4,682,335 | 7/1987 | Hughes | 372/66 |
| 4,740,983 | 4/1988 | Azad | 372/35 |
| 4,974,230 | 11/1990 | Hemmati | 372/41 |
| 5,291,504 | 3/1994 | Bournes . | |
| 5,299,213 | 3/1994 | Kuba et al. . | |
| 5,311,528 | 5/1994 | Fujino | 372/34 |
| 5,321,711 | 6/1994 | Rapoport et al. | 372/41 |
| 5,327,442 | 7/1994 | Yarborough et al. . | |
| 5,353,293 | 10/1994 | Shull . | |
| 5,394,420 | 2/1995 | Senn et al. | 372/66 |
| 5,563,899 | 10/1996 | Meissner et al. | 372/35 |

OTHER PUBLICATIONS

"Diode laser pumped blue–light souces at 473 nm using intracavity frequency doubling of a 946 nm Nd:YAG laser", Appl. Phys. Lett.54(17), 24 Apr. 1989.

"High–average–power operation of Q–switched diode–pumped holmium laser", Optics Letters/vol. 18, No. 20/Oct. 15, 1993.

*Primary Examiner*—Bernarr E. Gregory

[57] ABSTRACT

A solid state laser comprises a composite solid state laser gain element, The gain element comprises a undoped section and a doped section having a concentration of dopant ions for absorbing pumping radiation. The doped section is diffusion bonded to the undoped section to form an active region in the gain element, A cooling jacket conducts flowing coolant around the circumference of a portion of the gain element surrounding the active region.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COOLING DEVICE FOR SOLID STATE LASER

BACKGROUND OF THE INVENTION

The present invention relates to solid state lasers. More specifically, but without limitation thereto, the present invention relates to a solid state three level laser having a diffusion bonded composite gain element and an improved cooling system for attaining high output power levels.

In quasi-three level lasers, the laser transition terminates at a state which is near the ground state and is thermally populated. An example of such a laser is a neodymium doped yttrium aluminum garnet (Nd:YAG) laser operating at 946 nm. This emission involves a transition in neodymium from the $^4F_{3/2}$ state to the highest of the ground $^4I_{9/2}$ states. The energy of this terminal level is approximately 860 $cm^{-1}$ above the lowest level, and about one percent of the neodymium atoms are thermally excited to this level at room temperature. This results in a ground state absorption at 946 nm and an increased pump energy threshold.

The physics of such laser systems are well known, and a number of publications have described the operation of these lasers both theoretically and experimentally. It is generally desirable to reduce optical path lengths in the laser gain element where the population inversion is insufficient to overcome the ground state loss. Further, to reduce the absorption loss, efficient cooling of the laser gain element is desirable to maintain the lowest practical operating temperature.

The most efficient operation of quasi-three level lasers at relatively low power has been demonstrated by end or longitudinal pumping a thin slab or disk of laser material. The material is often configured as an active mirror (i.e. one with gain) and the pump light is focused through an end face. A dielectric coating on the end face is designed to transmit pump light and also to serve as a highly reflective coating for the laser output. High pump power densities may be obtained using single emitter, high brightness laser diodes as a pump source, and a short active gain length helps to keep ground state absorption low. This results in a reasonably low pump threshold power and efficient laser performance.

With recent advances in laser diode array technology, it has now become possible to focus many tens of watts of pump light in the laser material in an area of only a few square mm. The simple techniques described above are not sufficient for operating such lasers at these higher power levels. Since the laser medium is typically cooled by conducting heat to a solid heat sink over the limited surface area of the short gain length, the heat conduction is less than optimum. Further, the faces of the laser medium where heat generation is greatest are typically exposed to the ambient atmosphere and are not directly cooled by the heat sink.

Despite efforts to improve cooling the laser gain element, a need continues to exist for a cooling technique that allows higher power levels to be attained for solid state three level lasers.

SUMMARY OF THE INVENTION

The solid state laser of the present invention is directed to overcoming the problems described above, and may provide further related advantages. No embodiment of the present invention described herein should be construed to preclude other embodiments or advantages that may exist or become obvious to those skilled in the art.

A solid state laser comprises a diffusion bonded composite solid state laser gain element. The gain element comprises a undoped section and a doped section having a concentration of dopant ions for absorbing pumping radiation. The doped section is diffusion bonded to the undoped section to form an active region in the gain element. A cooling jacket conducts flowing coolant around the circumference of a portion of the gain element surrounding the active region.

An advantage of the solid state laser of the present invention is that improved cooling is provided for short lengths of laser gain elements.

Another advantage is that higher output power may be realized for quasi-three level lasers such as a Nd:YAG laser operating at 946 nm.

Yet another advantage is that since no turbulent liquids or gases are required within the laser resonator cavity, consequent optical distortion is avoided.

DESCRIPTION OF THE INVENTION

The following description is presented solely for the purpose of disclosing how the present invention may be made and used. The scope of the invention is defined by the claims.

Figure 1:
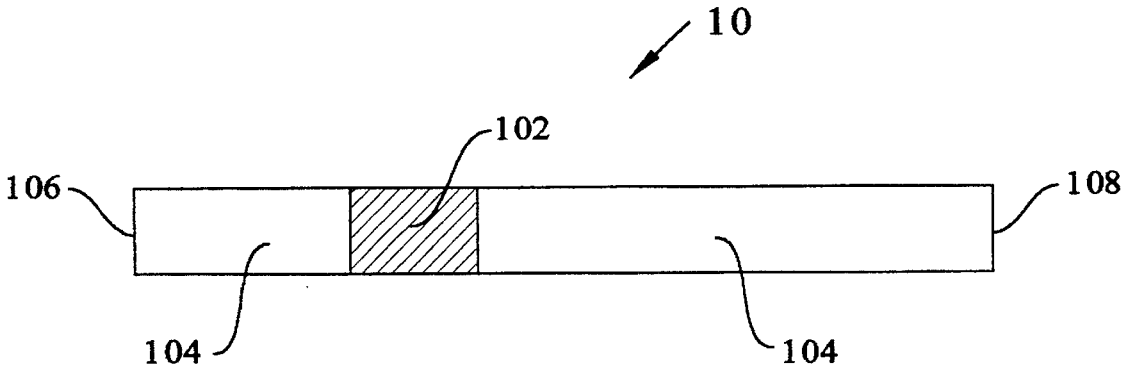
FIG. 1 is a diagram of a laser gain element of the present invention.

In FIG. 1, a solid state laser gain element 10 of the present invention comprises a doped section 102 diffusion bonded to undoped sections 104. The diffusion bond between doped section 102 and undoped sections 104 is readily achieved by a procedure where both surfaces are polished flat and placed in mutual contact as described in U.S. Pat. No. 5,441,803 issued on Aug. 15, 1995 to Helmuth Meissner included herein by reference thereto. The total optical transmission loss through the optical interfaces resulting from this process due to scatter and reflection is insignificant. The diffusion bond has a strength comparable to the original bulk material. The composite structure may then be shaped as desired and standard polishing and coating techniques may be applied to end faces 106 and 108. By way of example, undoped sections 104 may be made of yttrium aluminum garnet (YAG) and doped section 102 may be made of YAG doped with neodymium. Gain element 10 may also have a coating on end face 106, for example, that is highly reflective at 946 nm and highly transmissive at the pump wavelength and at 1064 nm.

Figure 2:
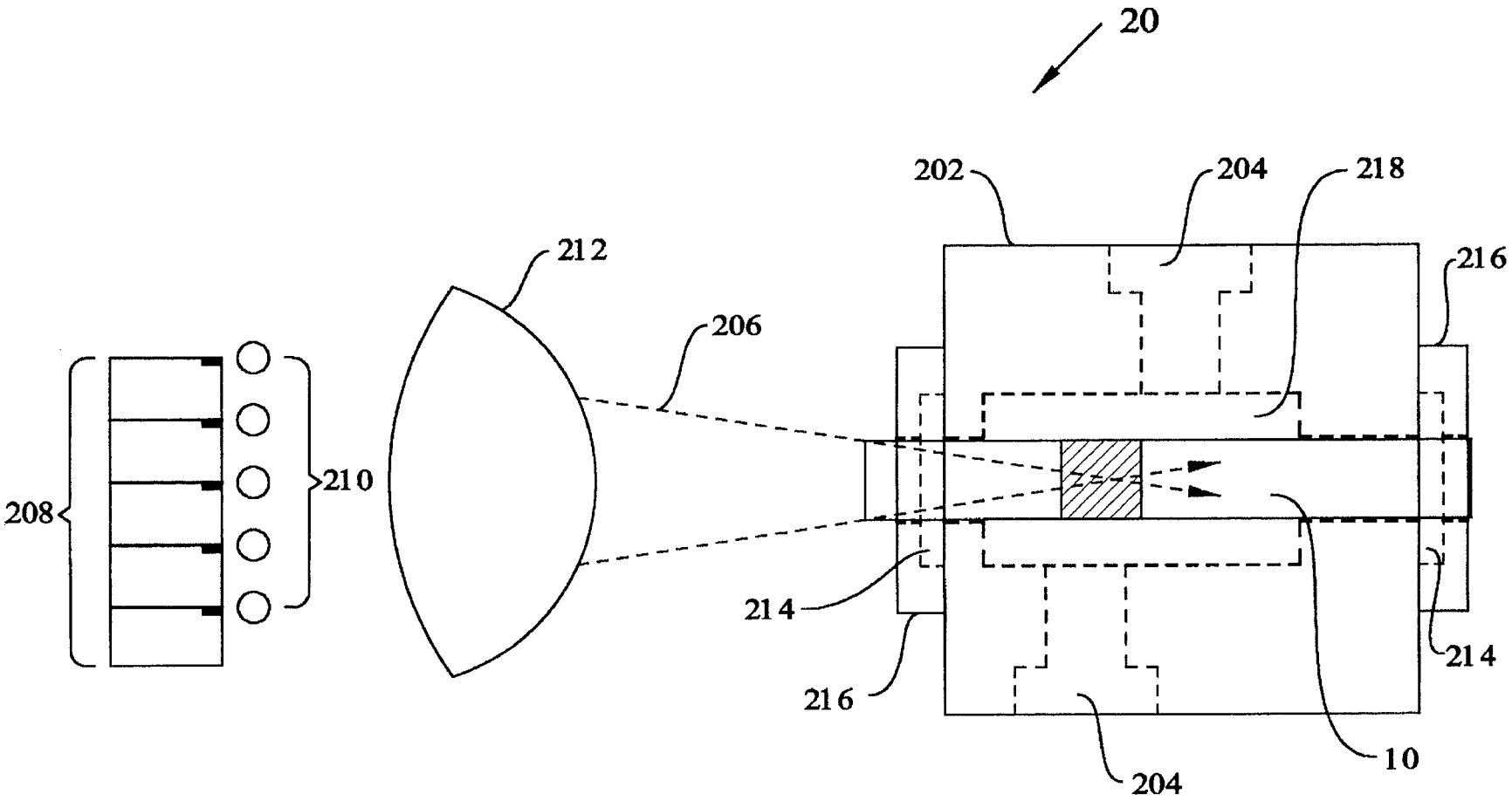
FIG. 2 is a diagram of a solid state laser incorporating the gain element of FIG. 1 and a cooling jacket of the present invention.

Referring now to FIG. 2, gain element 10 may be mounted in a pump head 20. A cooling jacket 202 conducts flowing water through ports 204 around the circumference of a portion of gain element 10 that includes active region 102. Seals 214 may be held in place by end caps 216 to prevent coolant from leaking from cooling jacket 202. Seals 214 may be, for example, rubber O-rings. Pumping radiation 206 may be provided by, for example, an array of laser diodes 208 focused by micro-lenses 210 and focusing lens 212 to concentrate pumping radiation 206 in active region 102. As shown in FIG. 2, cooling jacket 202 is arranged so that pumping radiation 202 does not have to pass through the coolant. Other end pumping techniques may be used as practiced in the art for pumping gain element 10. Cooling the entire circumference of gain element 10 surrounding active region 102 maintains a suitable operating temperature at high average pump powers. The coolant liquid may be water, for example, or another suitable coolant known in the art.

Other combinations of host material and dopant ions may be used as desired to achieve particular operating laser wavelengths and other properties. Trivalent ytterbium, thulium, holmium, and erbium all exhibit quasi-three level laser transitions where improved cooling increases laser efficiency. In general, doped section 102 are preferably made of a suitable host material doped with an active laser ion and undoped sections 104 are preferably made of the same host material.

Other modifications, variations, and applications of the present invention may be made in accordance with the above teachings other than as specifically described to practice the invention within the scope of the following claims.

I claim:

1. A cooling device for a solid state laser comprising a cooling jacket operably coupled to a composite solid state laser gain element having an undoped section and a doped section wherein said doped section has concentration of dopant ions for absorbing pumping radiation to form an active region in said gain element for conducting a flowing coolant around said active region of said gain element wherein said cooling jacket is arranged so that said pumping radiation does not pass through said coolant.

2. The cooling device of claim 1 wherein said doped section is diffusion bonded to said undoped section.

3. The cooling device of claim 1 wherein said coolant comprises water.

4. The cooling device of claim 1 further comprising a pumping source to provide said pumping radiation.

5. The cooling device of claim 4, wherein said pumping source comprises an array of laser diodes and focusing optics operably coupled to said laser diodes for concentrating radiation from said laser diodes onto said active region.

6. The cooling device of claim 1 wherein said undoped section comprises yttrium aluminum garnet and said doped section comprises neodymium doped yttrium aluminum garnet.

* * * * *